United States Patent [19]

Komaki et al.

[11] Patent Number: 5,179,547
[45] Date of Patent: Jan. 12, 1993

[54] PHASE CHANGE OPTICAL INFORMATION RECORDING MEDIUM INCLUDING MEANS FOR PREVENTING MOVEMENT OF THE RECORDED PORTION

[75] Inventors: Toshihiro Komaki; Hideo Kudo; Tomonori Ishizuki; Ryoichi Hirota; Masahiro Katsumura; Seishi Maita, all of Saitama, Japan

[73] Assignee: Pioneer Electronic Corporation, Tokyo, Japan

[21] Appl. No.: 706,164

[22] Filed: May 28, 1991

[30] Foreign Application Priority Data

Oct. 12, 1990 [JP] Japan .................................. 2-274505

[51] Int. Cl.⁵ .................................................. G11B 7/24
[52] U.S. Cl. ............................. 369/275.4; 369/275.5; 369/275.1; 369/100; 369/109
[58] Field of Search .................. 369/275.1–275.5, 369/100, 109

[56] References Cited

U.S. PATENT DOCUMENTS

| 4,761,775 | 8/1988 | Murakami ..................... 369/275.3 |
| 4,910,725 | 3/1990 | Drexler et al. ................. 369/275.1 |
| 4,949,331 | 8/1990 | Maeda et al. .................... 369/109 |
| 4,991,163 | 2/1991 | Tokushuku et al. ............ 369/275.4 |

FOREIGN PATENT DOCUMENTS

| 164131 | 12/1985 | European Pat. Off. . |
| 329425 | 8/1989 | European Pat. Off. . |
| 58-100247 | 6/1983 | Japan . |
| 63-148420 | 6/1988 | Japan ........................... 369/275.3 |
| 63-161546 | 7/1988 | Japan . |
| 2-87343 | 3/1990 | Japan . |

*Primary Examiner*—Hoa T. Nguyen
*Attorney, Agent, or Firm*—Fish & Richardson

[57] ABSTRACT

On the phase change optical information recording medium, a plurality of protection pits each smaller than one pit on the pre-pit region are provided over the entire data region of the recording film at least on its surface. Therefore, even when overwriting is repeatedly performed, the reproduced data waveform is distorted less frequently and data error is reduced. By forming the group of protection pits, the adhesive strength between the phase change recording film and the protective film can be increased, and the reliability of exfoliating strength can be improved.

17 Claims, 2 Drawing Sheets

PHASE CHANGE OPTICAL INFORMATION RECORDING MEDIUM INCLUDING MEANS FOR PREVENTING MOVEMENT OF THE RECORDED PORTION

BACKGROUND OF THE INVENTION

1. Field of the invention

The present invention relates to a phase change optical information recording medium.

2. Description of the prior art

There are known optical information recording media such as a magneto-optical disk, a phase change optical disk, etc. which have been developed as rewritable recording media of an EDRAW (Erasable Direct Read After Write) type.

In such the recording media of phase change type, there is an optical disk having a recording thin film made of a chalcogenide alloy, for example. The information to be recorded into such a phase change optical disk is written by the irradiation of laser beam, and then the recorded information is read by detecting the difference of reflection due to the phase change between crystalline and amorphous states in the recording layer. The laser beam is used with its intensity modulated in the writing, erasing and reading (overwriting) modes. For example, a plurality of minute amorphous domains are provided along tracks of the recording film whose surface is a coarse crystalline state by heating and quick cooling due to irradiated spots of scanning laser beam. In this way, the information is recorded as rows of amorphous domains on the tracks of the optical disk.

FIG. 1 is a schematic illustration of data waveform which is reproduced from a phase change optical disk after the overwriting has been repeatedly performed thereon, the phase change optical disk being formatted with a sampled servo tracking method. In case that this sampled servo tracking method is based on ISO standards, any information is not recorded on the predetermined channel in a unit byte consisting of a plurality of channels, for example 15 channels. Therefore, no amorphous domain is formed at the corresponding portion to the predetermined channel, for example the 15th channel, in the pre-pit region along the track of the recording film. The reproduced data waveform is therefore distorted from the portion (A) of the predetermined channel through the following data region, as shown in FIG. 1, and this distortion causes data error in the reproduction of the recorded information.

FIG. 2 is a schematic illustration of data waveform which is reproduced from a phase change optical disk after the over-writing has been repeatedly performed thereon, the phase change optical disk having grooves on both sides of the recording track thereof and formatted with continuous servo tracking method. The data error is also distorted at the rear terminal portion (B) of the data region from far the pre-pit region, as shown in FIG. 2, when the data reproduced through the continuous servo tracking method on the phase change optical disk.

In this way, in this phase change optical disk, there is a problem that the overwriting characteristic deteriorates when the overwriting is repeatedly performed.

SUMMARY OF THE INVENTION

The object of the present invention is to provide a phase change optical information recording medium for reducing the data error in the reproduction of information by the suppression of "the moving of the recorded portion" even when the overwriting is repeatedly performed.

The phase change optical information recording medium according to the present invention comprises:
a recording film of phase change type having
pre-pit regions in each of which pre-pits are formed on the surface along a track and
data regions each defined between the adjacent pre-pit regions along the track and having a plurality of protection pits each being smaller than one of said pre-pits, said protection pits being formed and distributed at least on the entire surface thereof, and
a transparent substrate supporting said phase change type recording film.

The above and other objects, features and advantages of the present invention will become more apparent from the following description when taken in conjunction with the accompanying drawings in which a preferred embodiment of the present invention is shown by way of illustrative example.

DETAILED DESCRIPTION OF PREFERRED EMBODIMENTS

The present inventors have found a phenomenon that the positions of amorphous domains formed by irradiation of laser beam are deviated from the desired positions previously formed when the overwriting is repeatedly performed too frequently in the phase change optical disk formatted in accordance with the sampled servo tracking method. The inventors call this phenomenon "the moving of the recorded portion".

The cause of "the moving of the recorded portion" is not yet clear, but it may be attributable to the partial high pressure caused by a volume increase of the portion of the recording film where the phase change is occurring by the irradiation of laser beam.

The more overwriting is repeatedly performed on the phase change optical disk, the more density and film thickness are remarkably increased on the track thereof.

The formation of one amorphous domain, i.e. recorded portion, is observed by an SEM system. As soon as a moving laser beam is irradiated on a spot on the recording film which is in the crystalline state, this spot portion of the recording film melts and changes from solid state to liquid to increase in the volume. The pressure in the spot portion is raised due to the increase of volume thereof, since the recording film is sandwiched between two protective films. The cooling speed in the front half region of the spot portion is slower than the rear half region thereof in the moving direction of the laser beam spot, because the influence of heat transferred from the rear half of the spot portion, and then the rear half becomes the amorphous state prior to the front half. The front half region of the spot portion closer to the liquid state with the increase of pressure, is therefore pressed forwardly by the reaction from the rear half region thereof. As a result, the formed amorphous domain forwardly moves along with the moving direction of the spot from the desired recorded position.

The inventors have found that the distortion of the data waveform is avoided when the moving of the recorded portion is suppressed through the following embodiments.

Figure 3A:
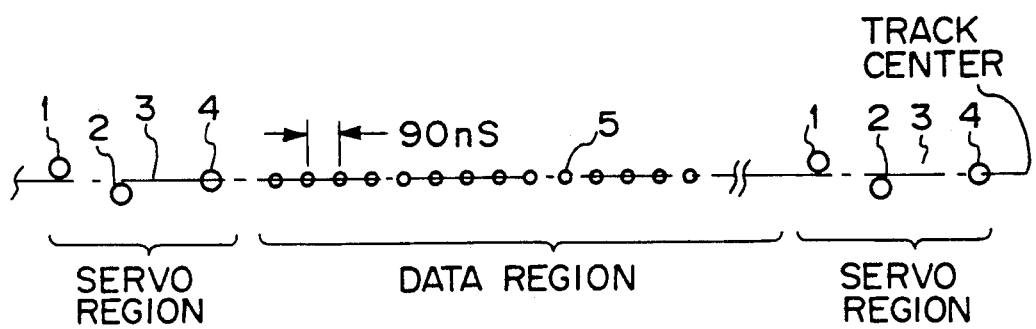
FIG. 3A shows a first embodiment according to the present invention, showing a partial plan view of one track of the phase change optical disk formatted by the sampled servo tracking method.

FIG. 3A shows a first embodiment of the present invention, showing a group of minute pits provided on a phase change optical disk formatted by the sampled servo tracking method (hereinafter referred simply as "disk"). This disk comprises a recording film and a transparent substrate for supporting the recording film. The recording film may be made of a chalcogenide alloy and the substrate may be made of PMMA, for example. The track of this disk is divided into a servo region and a data region having a plurality of protection pits 5. Each of the pre-pits 1-4 has an approximately circular shape in the plan view.

The servo region consists of two pits 1 and 2 provided in a wobbled arrangement along the track center, a mirror surface 3, a single pit 4 provided at the center of the track, and other pits (not shown). Two wobbled pits 1 and 2 are used for the tracking servo control, the mirror surface 3 is used for the focus servo control, and the single pit 4 at the track center is used for a clock pit for generating a clock for reproducing the data recorded on the disk. By this servo region, it is possible to perform each of the above servo controls without providing any grooves disposed at the both sides of the pre-pits.

In the present embodiment, the protection pits are formed in such a manner that a modulated laser beam spots with a time interval of 90 nanoseconds are irradiated on the track center in the data region as shown in FIG. 3A during the mastering process of the disk. The row of protection pits 5 is provided in this way. Each minute protection pit is smaller than one of pre-pits in the diameter or area thereof. The depth of this protection pit is 100–1000 Å. This depth of this protection pit is defined as $\lambda/(4n)$ or less wherein $\lambda$ presents the wavelength of the laser beam for reading the data recorded on the disk and "n" represents the refractive index of the transparent substrate. This is because to prevent the impairment to demodulation of the reading signal to be read from the disk. The depth of the protection pit is set with $\lambda/8$ in this embodiment.

Figure 3B:
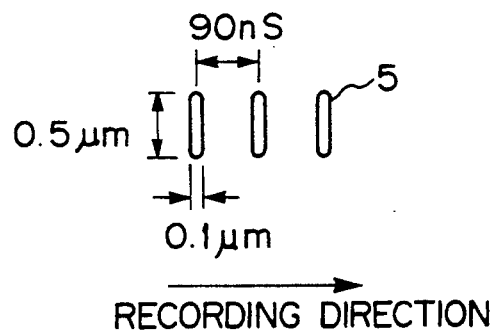
FIG. 3B shows a partially enlarged plan view of protection pits of FIG. 3A.

FIG. 3B is a partially enlarged view of the shape of protection pit 5. As shown in this figure, the protection pit is in oval form. The length of the protection pit is 0.1 μm in the track tangential direction (recording direction) and 0.5 μm in radial direction of the disk. The protection pits 5 absorb the increase of volume and pressure of the recording film portion within the irradiated laser beam spot during the overwriting to reduce "the moving of the recorded portion" in the recording film.

Therefore, the present embodiment reduces the distortion of the reproduced data waveform and decreases the data error, even when the overwriting is performed repeatedly.

Figure 1:
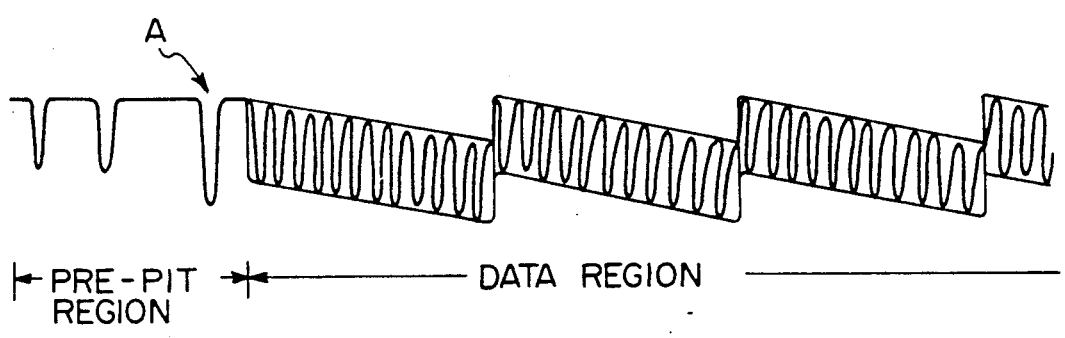
FIG. 1 is a schematic illustration of reproduced waveforms including data distortion in the sampled servo tracking method.
Figure 2:
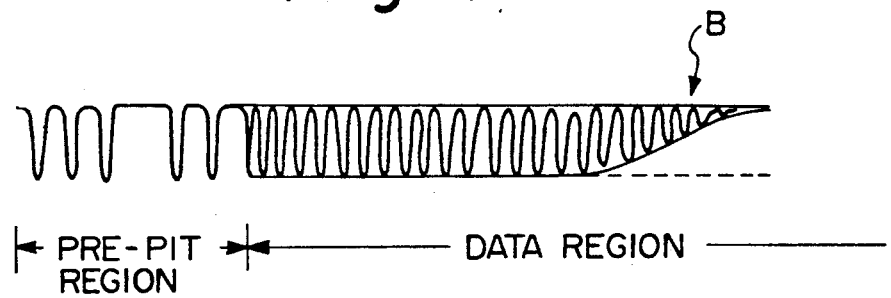
FIG. 2 is a schematic illustration of waveforms including data distortion in the continuous servo tracking method.
Figure 4:
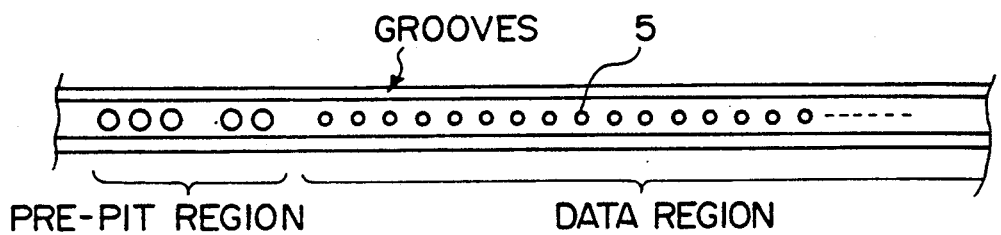
FIG. 4 shows a second embodiment according to this invention, showing a partial plan view of one track of the phase change optical disk formatted by the continuous servo tracking method.

FIG. 4 shows a second embodiment provided with a group of protection pits 5 on a disk formatted by the continuous servo tracking method. Just like the case of the disk formatted by the sampled servo tracking method, the group of protection pits 5 does not exert any adverse influence on the demodulation of the reading signal. By this group of protection pits 5, it is possible to suppress the moving of the recorded portion and to reduce the data errors as corresponding to the terminal portion of the data region as shown in FIG. 2.

In the first and the second embodiments as described above, the depth of the pit in the group of protection pits 5 has been set to 100 to 1000 Å. However the depth and the shape of the pit are not limited to the above. The depth or shape will be set so as to prevent "the moving of the recorded portion" of the recording film so that the demodulation of the signal read from the disk is not influenced adversely.

Also, the shape of the protection pit is limited to a hole in the above mentioned, but it may be formed as minute irregular recesses in the form of a so-called moth eye, distributed over the entire surface of the recording film.

The phase change recording film is closely bonded with a protective film by adhesive film. The strength of this adhesive film is deteriorated in the lapse of time and through the repeated overwriting, and then the exfoliating phenomenon may occur in the conventional disk. However, by providing the above group of protection pits 5 on the recording film, the adhesive strength can be increased by the cumulative effect of engagement.

As described above, it is possible by the phase change optical information recording medium according to the present invention to obtain a recording medium with less data error even when the overwriting is repeatedly performed because the protection pits smaller than a pre-pit is provided at least on the surface over the entire data region of the recording film.

Further, by forming a group of smaller protection pits, it is possible to increase the adhesive strength between the phase change recording film and the protective film in the multi-layered structure medium to improve the reliability of the exfoliating strength.

What is claimed is:

1. A phase change optical information recording medium, comprising:
    a transparent substrate; and
    a phase change type recording film supported by the transparent substrate and having a track defined on a surface thereof, said recording film comprising:
        a data region defined along the track for storing recorded information, and
        movement prevention means provided in the data region for preventing movement of the recorded information.

2. A phase change optical information recording medium as claimed in claim 1, wherein said movement prevention means are formed only along the track of the recording film.

3. A phase change optical information recording medium as claimed in claim 1, wherein said movement prevention means are distributed over the surface of the recording film.

4. A phase change optical information recording medium as claimed in claim 1, wherein said movement prevention means comprises a plurality of protection pits.

5. A phase change optical information recording medium as claimed in claim 4, wherein said protection pits are oval-shaped.

6. A phase change optical information recording medium as claimed in claim 4, wherein said protection pits are circular.

7. A phase change optical information recording medium as claimed in claim 4, wherein said movement prevention means are formed only along the track of the recording film.

8. A phase change optical information recording medium as claimed in claim 4, wherein said movement prevention means are distributed over the surface of the recording film.

9. A phase change optical information recording medium as claimed in claim 4, wherein the depth of each of said protection pits is no more than $\lambda/(4n)$ or less wherein $\lambda$ represents the wavelength of an irradiated light beam and (n) represents the refractive index of the transparent substrate.

10. A phase change optical information recording medium as claimed in claim 1, wherein said movement prevention means comprises a plurality of irregular recesses distributed over the surface of the recording film.

11. A phase change optical information recording medium, comprising:
- a transparent substrate; and
- a phase change type recording film supported by the transparent substrate and having a track defined on a surface thereof, said recording film comprising:
  - a plurality of pre-pit regions formed along the track each comprising at least one pre-pit,
  - a data region defined along the track between adjacent pre-pit regions for storing recorded information, and
  - movement prevention means provided in the data region for preventing movement of the recorded information.

12. A phase change optical information recording medium as claimed in claim 11, wherein said movement prevention means comprises a plurality of protection pits.

13. A phase change optical information recording medium as claimed in claim 12, wherein the area of each of said protection pits is smaller than the area of said at least one pre-pit.

14. A phase change optical information recording medium as claimed in claim 12, wherein said at least one pre-pit and said protection pits are circular, and wherein the diameter of each of said protection pits is smaller than the diameter of said at least one pre-pit.

15. A phase change optical information recording medium as claimed in claim 12, wherein the depth of each of said protection pits is no more than $\lambda/(4n)$ or less wherein $\lambda$ represents the wavelength of an irradiated light beam and (n) represents the refractive index of the transparent substrate.

16. A phase change optical information recording medium as claimed in claim 11, wherein said movement prevention means are formed only along the tack of the recording film.

17. A phase change optical information recording medium as claimed in claim 11, wherein said movement prevention means are distributed over the surface of the recording film.

* * * * *